United States Patent [19]

Haass

[11] 4,250,459
[45] Feb. 10, 1981

[54] CIRCUIT ARRANGEMENT FOR AUTOMATIC DISTORTION CORRECTION OF A SIGNAL

[75] Inventor: Adolf Haass, Munich, Fed. Rep. of Germany

[73] Assignee: Siemens Aktiengesellschaft, Berlin & Munich, Fed. Rep. of Germany

[21] Appl. No.: 15,204

[22] Filed: Feb. 26, 1979

[30] Foreign Application Priority Data

Mar. 10, 1978 [DE] Fed. Rep. of Germany ....... 2810504

[51] Int. Cl.$^3$ .............................................. H03G 9/24
[52] U.S. Cl. .................................. 330/145; 330/149; 330/284; 333/18
[58] Field of Search ............... 330/126, 145, 149, 133, 330/284, 304; 333/14, 18

[56] References Cited

U.S. PATENT DOCUMENTS

| | | | |
|---|---|---|---|
| 3,728,649 | 4/1973 | Waldhauer | 333/18 |
| 3,824,501 | 7/1974 | Harris | 328/167 X |
| 3,965,436 | 6/1976 | Dixon | 330/284 X |
| 4,045,748 | 8/1977 | Filliman | 330/126 |
| 4,061,970 | 12/1977 | Magneron | 333/18 X |
| 4,101,849 | 7/1978 | Blackmer et al. | 330/126 X |

Primary Examiner—James B. Mullins
Attorney, Agent, or Firm—Hill, Van Santen, Steadman, Chiara & Simpson

[57] ABSTRACT

A circuit arrangement for automatic distortion correction of a signal transmitted over a line having low-pass filter characteristics, employs a distortion corrector having a controllable high-pass filter and a controllable-gain amplifier. The distortion corrector includes the high-pass filter with a predetermined frequency characteristic and a first attenuator connected in series therewith in a first branch, and a two-terminal network of a predetermined frequency characteristic in a second branch. The controlled-gain amplifier includes a second attenuator and an amplifier connected in series therewith which effects a predetermined amplification. The current/voltage characteristics of the first and second attenuators are substantially identical and their attenuation depends on a signal which is derived from the distortion-correct signal by means of rectification and smoothing.

1 Claim, 12 Drawing Figures

CIRCUIT ARRANGEMENT FOR AUTOMATIC DISTORTION CORRECTION OF A SIGNAL

BACKGROUND OF THE INVENTION

1. Field of the Invention

The present invention relates to a circuit arrangement for automatic distortion correction of a signal which has been transmitted over a line having low-pass filter characteristics and which is fed to a distortion corrector having a controllable high-pass filter and a controllable-gain amplifer. As an example, the line can be a two-wire circuit of a local cable.

2. Description of the Prior Art

As is well known in the art, the level of a signal is lowered all the more after transmission by way of a line, with respect to the length of the line. At the same time, all frequency components and, particularly the high-frequency components, of the signal are attenuated all the more, the longer the line. Therefore, the low-pass filter behavior of the line is all the more pronounced with increasing line length. As is known in the art, a distortion-corrected signal is desired whose level and whose frequency characteristic is constant and independent of the length of the line.

For automatic distortion correction of a signal, as is known in the art, the signal to be corrected can be transmitted by way of a controllable high-pass filter and by way of a controllable-gain amplifier, whereby, as a function of the output signal of the controlled-gain amplifier, a control voltage is derived with which both the high-pass behavior of the high-pass filter, as well as the amplification of the controllable-gain amplifier, can be regulated in such a manner that a distortion-corrected signal is delivered at the output of the control-gain amplifier. Circuit arrangements known in the art which effect such an automatic distortion correction of the signal require a relatively large technical expense and a large expense with respect to time in order to match the various control loops of the high-pass filter and of the controlled-gain amplifier to one another and adapt the same to the low-pass filter characteristic of the line.

SUMMARY OF THE INVENTION

The object of the present invention is to provide a circuit arrangement of the type generally mentioned above which requires no alignment procedures.

The above object is achieved by simultaneous employment of the following measures:

(A) In a first branch, the distortion corrector contains a high-pass filter of a predetermined frequency characteristic and a first attenuator connected in series therewith, and also contains, in a second branch, a two-terminal network of a predetermined frequency characteristic;

(B) The controlled-gain amplifier comprises a second attenuator and an amplifier connected in series therewith which effects a predetermined amplification; and (C) The current/voltage characteristics of the first attenuator and the second attenuator are substantially identical and their attenuation depends on a signal which is derived from the distortion-corrected output signal by means of rectification and smoothing thereof.

A circuit arrangement constructed in accordance with the present invention is particularly characterized in that no alignment of the control systems of the high-pass filter and of the control-gain amplifier is required. This is because the high-pass filter in the first branch has a predetermined characteristic, because the amplifier of the controlled-gain amplifier has a predetermined amplification and because the two attenuators have the same characteristics and are influenced with the same signal.

A circuit arrangement constructed in accordance with the present invention is further characterized by high temperature stability because, upon possibly occurring temperature changes, the two attenuators behave in a similar manner because of their like characteristics.

A circuit arrangement constructed in accordance with the present invention is also largely independent of changes in the supply voltage, in that such changes affect both attenuators in a similar manner.

A further advantage of a circuit arrangement constructed in accordance with the present invention can be seen in that it is easily adapted to predetermined line characteristics in that no alignment of the two attenuators is required after such adaptations.

In case the circuit arrangement is to be realized with particularly low technical expense, it is advantageous if the first attenuator and the second attenuator are formed of two respective crystal diodes; that the electrodes facing away from the junction point of the two crystal diodes are connected to terminals of a voltage source whose potentials are symmetrical with respect to a reference potential and at which a voltage difference occurs which depends on the distortion-corrected signal; and that the two crystal diodes are poled in the conducting direction with reference to the voltage source.

In case the low-pass filter characteristics of the line in the desired frequency range is to be particularly precisely approximated, it is advantageous if a third branch is employed parallel to the second branch, in which a further high-pass filter having a predetermined frequency characteristic is arranged in series with a further attenuator; that the third branch is connected to a summer which sums the signals transmitted by way of the first, second and third branches; and that the current/voltage characteristic of the third attenuator is substantially the same as the current/voltage characteristics of the first attenuator and the second attenuator and that its attenuation is dependent on the signal which is derived from the distortion-corrected signal.

In case the low-pass filter characteristic of the line does not increase linearly with line length, but rather quadratically, it is advantageous that, in the first branch, an additional high-pass filter and an additional attenuator are arranged in series with respect to the high-pass filter and to the first attenuator; and that the current/voltage characteristic of the additional attenuator is substantially the same as the current/voltage characteristic of the first attenuator and is controlled with the signal which is derived from the distortion-corrected signal by means of rectification and smoothing.

In order to realize the voltage source in a rational manner, it is advantageous that the voltage source be formed of a first operational amplifier and a second operational amplifier, of a further crystal diode, of a capacitor and of a first resistor, a second resistor and a third resistor; that the distortion-corrected signal is supplied by way of the further crystal diode to a terminal of the capacitor and the non-inverting input of the first operational amplifier; that the other terminal of the capacitor and the non-inverting channel of the second operational amplifier are connected with a circuit point at which a reference potential is applied; that the first resistor is connected parallel to the capacitor; that the inverting channel of the first operational amplifier is connected to the output of the first operational amplifier and to one of the electrodes of the crystal diode; that the output of the first operational amplifier is connected via a second resistor to the input of the inverting channel of the second operational amplifier and by way of the third resistor to the output of the second operational amplifier; and the output of the second operational amplifier is connected to the other electrode of the crystal diode.

BRIEF DESCRIPTION OF THE DRAWINGS

Other objects, features and advantages of the invention, its organization, construction and operation, will be best understood from the following detailed description, taken in conjunction with the accompanying drawings, on which.

DESCRIPTION OF THE PREFERRED EMBODIMENTS

Figure 1:
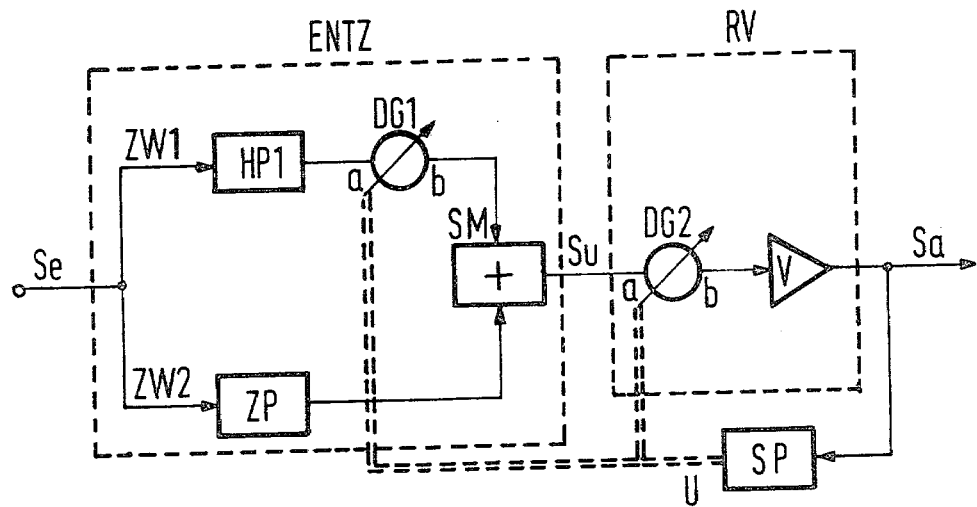
FIG. 1 is a schematic circuit diagram of an automatic distortion correction circuit arrangement in a fundamental and basic form.

Referring to FIG. 1, a circuit arrangement for automatic distortion correction of a signal Se is illustrated. It is assumed that the signal Se has been transmitted by way of a line having a low-pass filter characteristic. The circuit arrangement illustrated in FIG. 1 comprises a distortion corrector ENTZ, a controlled-gain amplifier RV and a voltage source SP. The distortion-correct signal Sa is delivered by way of the output of the controlled-gain amplifier.

A high-pass filter HP1 and an attenuator DG1 are connected in series in a first branch ZW1 of the distortion corrector. The characteristics of the high-pass filter HP1 is not changed, whereas the characteristics of the attenuator DG1 is influenced with the help of a signal U.

In a second branch ZW2, a two-terminal network ZP is arranged which has a predetermined frequency characteristic. This two-terminal network ZP, for example, can be constructed as an ohmic resistance. The frequency characteristic of this two-terminal network, however, is not influenced with the signal U. The first branch and the second branch are fed to a summer SM which delivers the sum signal Su.

The controlled-gain amplifier RV comprises an attenuator DG2 whose attenuation is controlled with the help of the signal U and an amplifier V whose amplification is not influenced with the control signal U.

The distortion-corrected signal Sa emitted by way of the output of the amplifier V is fed to the voltage source SP which functions as a rectifier in combination with the filter section and generates the signal U. The two attenuators DG1 and DG2 have the same current/voltage characteristics and the attenuations effected with these attenuators depend on the control signal U.

Figure 2:
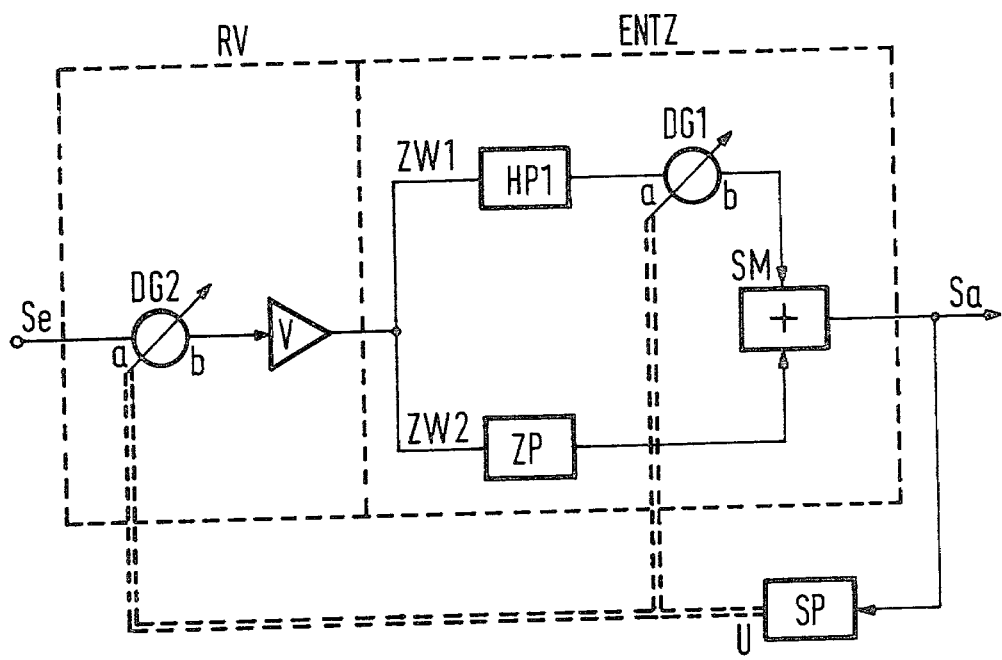
FIG. 2 is a further schematic diagram of another embodiment of an automatic distortion correction circuit arrangement constructed in accordance with the present invention.

FIG. 2 illustrates a further circuit arrangement for automatic distortion correction of a signal in which the signal Se to be corrected is first supplied to a controlled-gain amplifier RV and the output of the controlled-gain amplifier RV is connected to a distortion corrector EMTZ. It is also conceivable, in principle, to arrange the amplifier V so that it is connected to the summer SM, so that also in the case of FIG. 2 the distortion-corrected signal SA is delivered from the output of the amplifier V and is supplied to the voltage source SP. In this case, the output b of the attenuator DG2 would be directly connected to the two branches ZW1 and ZW2.

Figure 3:
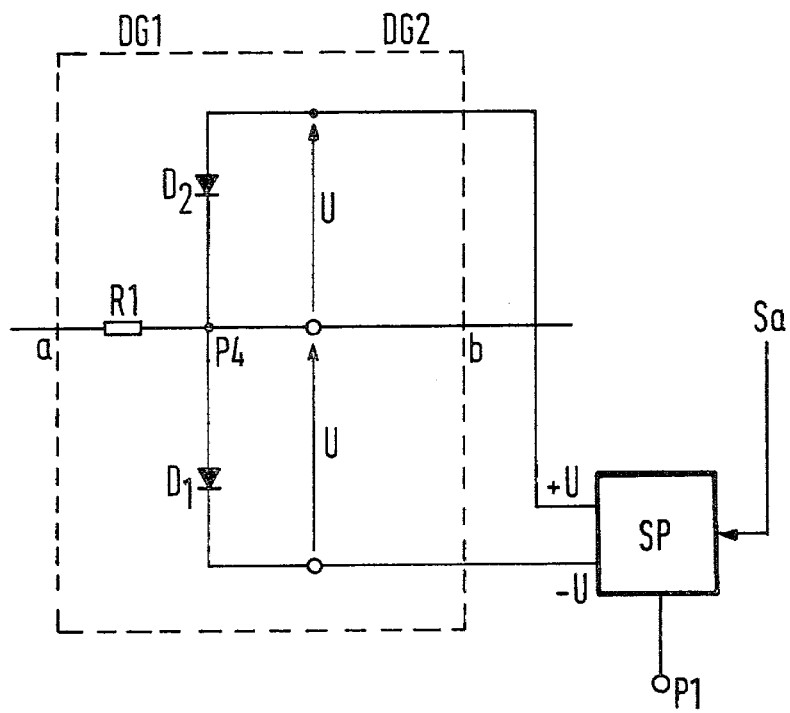
FIG. 3 is a schematic circuit diagram of an embodiment of the attenuators illustrated in FIG. 1.

FIG. 3 illustrates exemplary embodiments of the attenuators DG1 and DG2. The input a of an attenuator is connected by way of a resistor R1 to a junction point P4 of a pair of diodes D1 and D2. As a function of the distortion-corrected signal Sa, the voltage source SP delivers voltages −U or, respectively, +U, so that a voltage 2U is applied at both diodes. The resistances of the two diodes D1 and D2 can be changed with the voltage 2U. The diodes are poled in the conducting direction with reference to the voltage 2U. The mean potential at the input a is equal to a predetermined reference potential which is applied at a circuit point P1. The voltages −U and +U lie symmetrically with respect to the reference material. Such a reference potential can be realized, for example, by means of grounding. The mean potential of the signal delivered by way of the outputs b is likewise equal to the reference potential.

The larger the current through the two diodes D1 and D2, the more the signal supply by way of the input a is attenuated. When the level of the distortion-corrected signal Sa is smaller than the reference level, the voltage 2U is relatively small and the signal supplied by way of the input a is attenuated relatively little. In case a long line is presupposed and a relatively small level of the signal Se is to be corrected, in respect of distortion, then a relatively small level of the signal Sa is also to be assumed upon regulation which is not yet carried out. Upon this presupposition, the voltage source SP delivers a relatively small voltage 2U, so that the current through the two diodes is relatively small and the attenuation effected is small. The high-pass filter HP1 comes into full play because the attenuator DG1 attenuates the output signal of the high-pass filter only relatively little. The amplifier V, also, comes into full play because the sum signal Su is only slightly attenuated by means of the attenuator DG2. Thereby, a control loop is formed by means of the amplifier V, by means of the voltage source SP and by means of the attenuator DG2, whereas a control circuit is formed by the amplifier V, by the voltage source SP, by the attenuator DG1, by the summer SM and by the attenuator DG2. After the accomplished regulation or, respectively, control with the help of the signal U, the level of the signal Sa—in comparison to the level of the signal Se to be corrected—is more strongly boosted, working against the low-pass filter characteristics of the line.

In the case of a short line, a signal Se ensues with a relatively large level, so that a signal Sa with a relatively large level is to be assumed before the accomplished regulation or, respectively, control. The signal Sa having a relatively large level effects a relatively large voltage 2U. In this manner, the influence of the high-pass filter HP1 is reduced, on the one hand, by means of the relatively large attenuation of the attenuator DG1 and the influence of the amplifier V is also reduced by means of the relatively large attenuation of the attenuator DG2. In this manner, therefore, with short lines, the signal Se is amplified less and the low-pass filter characteristic is opposed less.

Figure 4:
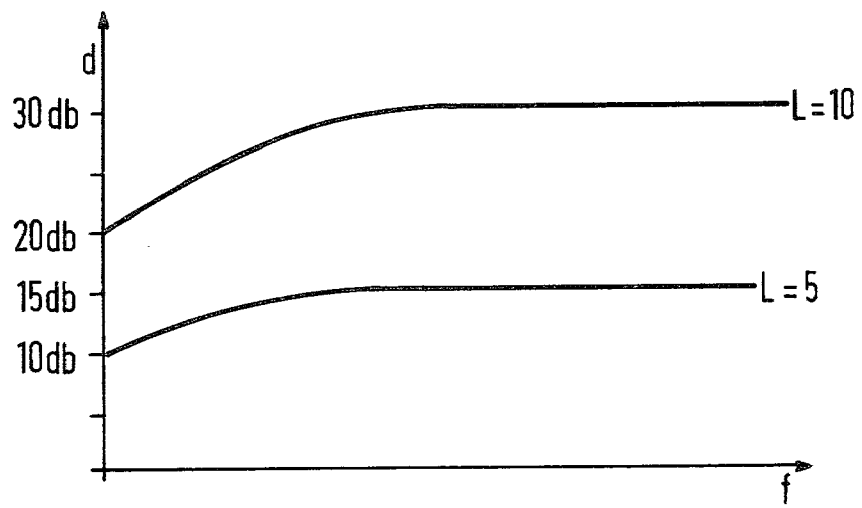
FIG. 4 illustrates the low-pass filter characteristics of various lines.

FIG. 4 illustrates low-pass filter characteristics of lines by way of which the signal Se to be corrected is transmitted. The two curves illustrated refer to subscriber's cable having a line length L=5 km and, respectively, L=10 km. The characteristics illustrate the dependency of the attenuation d on the frequency f. The attenuation d is smaller at low frequencies than at higher frequencies. It can also be seen that the attenuation d is greater with a greater line length L=10 km than with a comparatively smaller line length L=5 km. The curve concerning the line length L=5 km can be formed from a proportional share of about 10 db and a low-pass filter share of about 5 db. In many cases, the attenuation d indicated in db rises linearly with line length L. In the case illustrated, the doubled line length L=10 km, the proportional share also increases by a factor of 2 to the value d=20 db and the low-pass filter share increases to a value of 10 db.

The circuit arrangements illustrated in FIGS. 1 and 2 have the task of compensating the varying levels conditioned by means of the lines and the varying low-pass filter behavior, so that in an ideal case the level of the distortion-correct signal SA is equal to a constant rated level at all frequencies. As a general principle, the circuit arrangements illustrated in FIGS. 1 and 2 would have to be adjusted to a specific line characteristic. After consideration of the specific line characteristic, the circuit arrangements illustrated in FIGS. 1 and 2 automatically correct distortion at any given line length. In practice, the line characteristics of the lines generally available are largely alike so that an automatic distortion correction can be carried out in various lines and at any desired length in many practical cases with the circuit arrangements illustrated in FIGS. 1 and 2.

Figure 5:
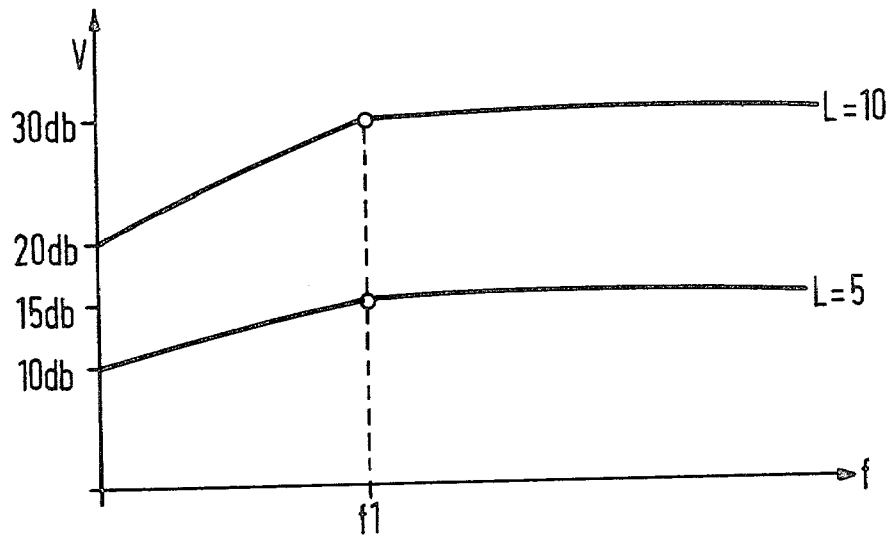
FIG. 5 illustrates the transmission characteristics corresponding to the low-pass filter characteristics illustrated in FIG. 3.

FIG. 5 illustrates two transmission characteristics of the circuit arrangement illustrated in FIG. 4 upon presupposition of the line characteristics illustrated in FIG. 4. The abscissa direction relates to the frequency f and the ordinate direction to the amplification v. A small amplification v is required at lower frequencies than at higher frequencies. The amplification v must be larger with greater line length than with smaller line length. The frequency f1 derives from the limiting frequency of the high-pass filter HP1.

Figure 6:
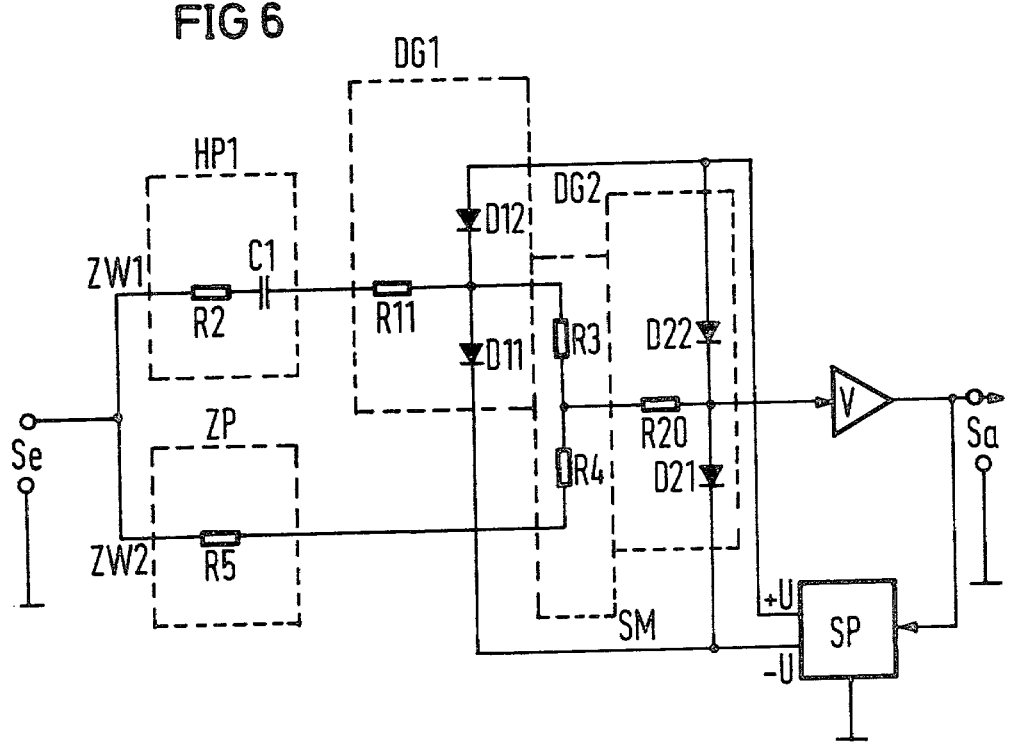
FIG. 6 is a schematic circuit diagram of an embodiment of the circuit arrangement illustrated in FIG. 1 upon employment of a plurality of diodes as crystal diodes.

FIG. 6 illustrates an exemplary embodiment of a circuit arrangement of the type illustrated in FIG. 1. The high-pass filter HP1 is formed by a resistor R2 and a capacitor C1. The two-terminal network ZP is formed by a resistor R5 and the attenuator DG1 comprises a resistor R11 and a pair of diodes D11 and D12. The attenuator DG2 comprises a resistor R20 and a pair of diodes D21 and D22. The summer SM is formed of a pair of resistors R3, R4 and a junction point of these two resistors.

Figure 7:
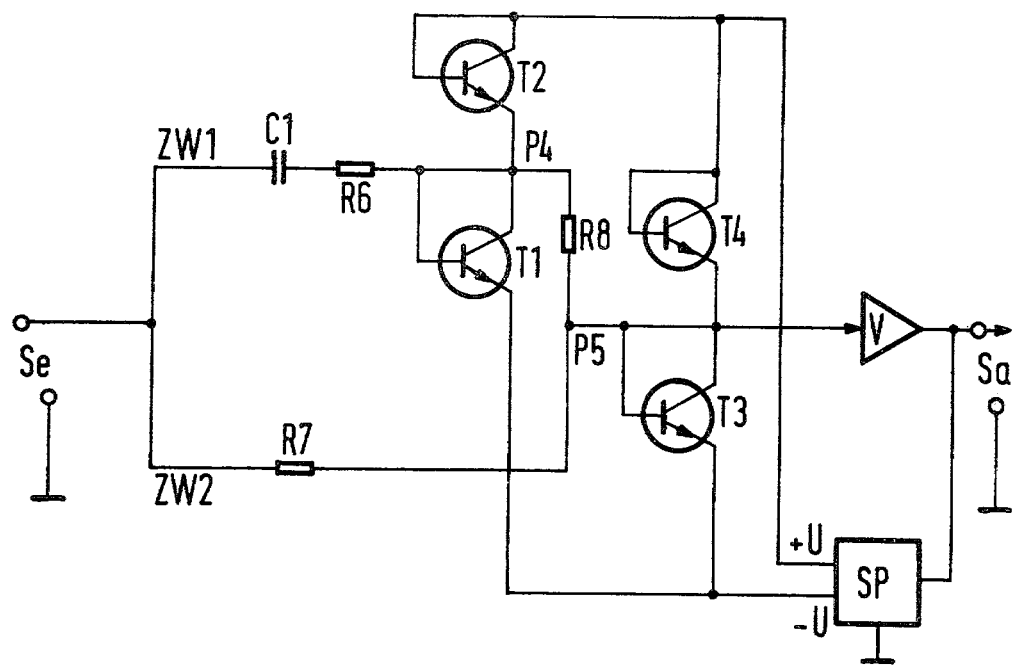
FIG. 7 is a schematic circuit diagram of an embodiment of the circuit arrangement illustrated in FIG. 1 upon employment of a plurality of transistors as the crystal diodes.

FIG. 7 illustrates a preferred exemplary embodiment of the circuit arrangement illustrated in FIG. 1 in which the high-pass filter is formed by a capacitor C1 and a resistor R6. The two-terminal network comprises a resistor R7, while an attenuator is formed of the resistor R6 and a pair of transistors T1 and T2. The second attenuator is formed by a pair of resistors R7, R8 and a pair of transistors T3 and T4. The summer comprises a pair of resistors R7, R8 and the junction point P5 therebetween. It can be seen immediately that the resistors R6, R7 and R8 fulfill multiple functions in conjunction with the high-pass filter and in conjunction with the attenuators.

Figure 8:
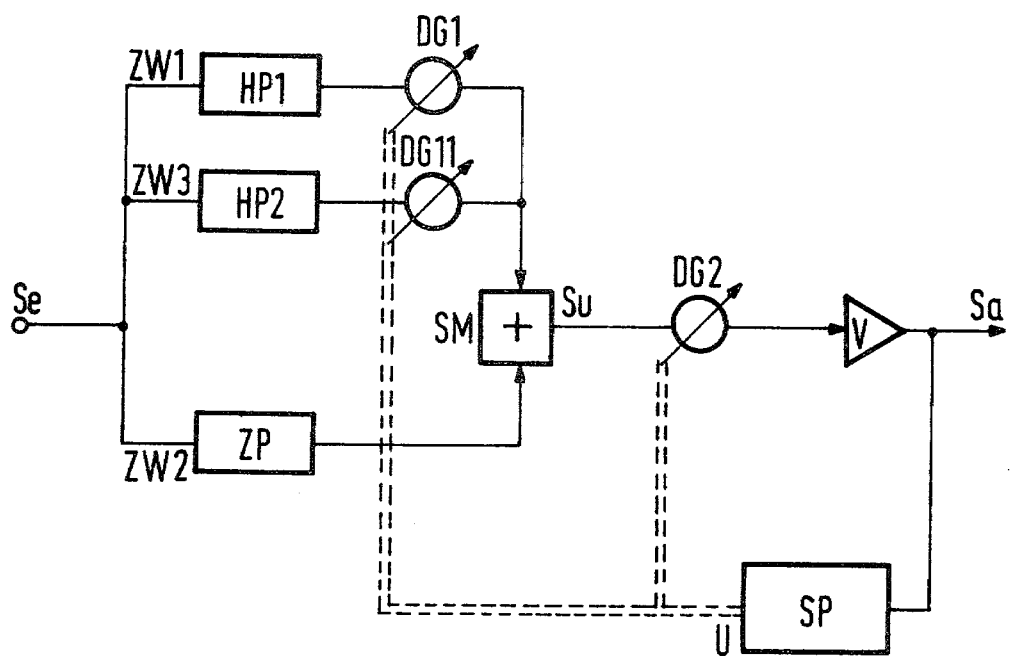
FIG. 8 is a schematic circuit diagram of a circuit arrangement for automatic distortion correction of a signal which has been transmitted by way of a line having particularly non-linear low-pass filter characteristics.

FIG. 8 illustrates a circuit arrangement which is specifically advantageous when the low-pass filter characteristics illustrated in FIG. 4 cannot be compensated with the help of a single high-pass filter HP1. According to FIG. 8, a high-pass filter HP2 and an attenuator DG11 are connected in series in a third branch ZW3 which is substantially parallel to the first and second branches ZW1 and ZW2. All of the attenuators DG1, DG2, DG11 illustrated in FIG. 8 have substantially the same current/voltage characteristics and are controlled with the same signal U. These attenuators can be realized, for example, with diodes in accordance with FIG. 6 or with transistors in accordance with FIG. 7.

It is also conceivable to arrange the branch ZW3 with the high-pass filter HP2 and the attenuator DG11 parallel to the branch ZW1 illustrated in FIG. 2.

Figure 9:
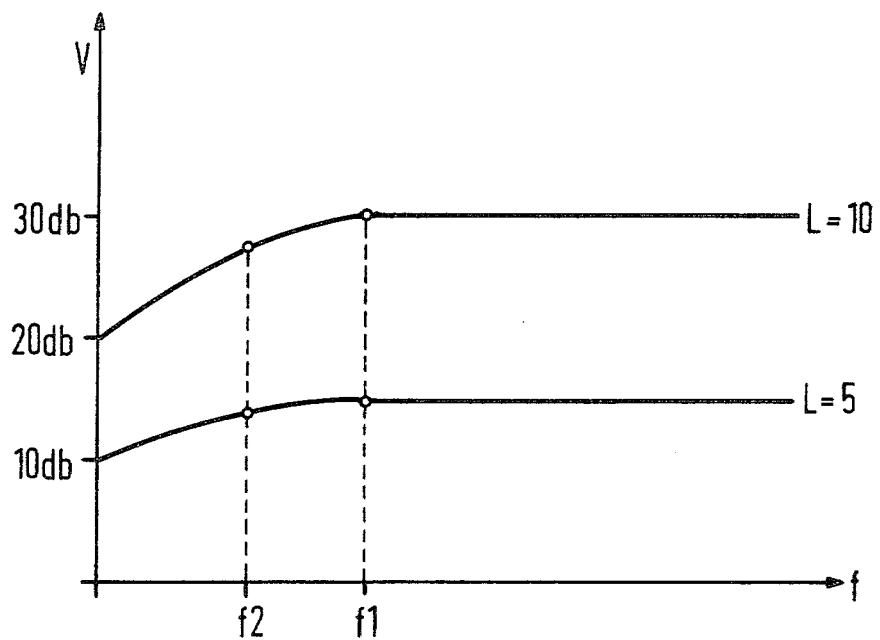
FIG. 9 illustrates amplifier characteristics relating to the manner of functioning of the circuit arrangement illustrated in FIG. 8.

FIG. 9 illustrates the transmission characteristics of the circuit arrangement illustrated in FIG. 8 upon presupposition of various line lengths L. Thereby, the frequency f1 is fixed by means of the limiting frequency of the high-pass filter HP1 and the frequency f2 is fixed by means of the limiting frequency of the high-pass filter HP2.

On general principle, it also conceivable to connect further high-pass filters and attenuators parallel and/or in series and to regulate and control the same with the same signal U.

Figure 10:
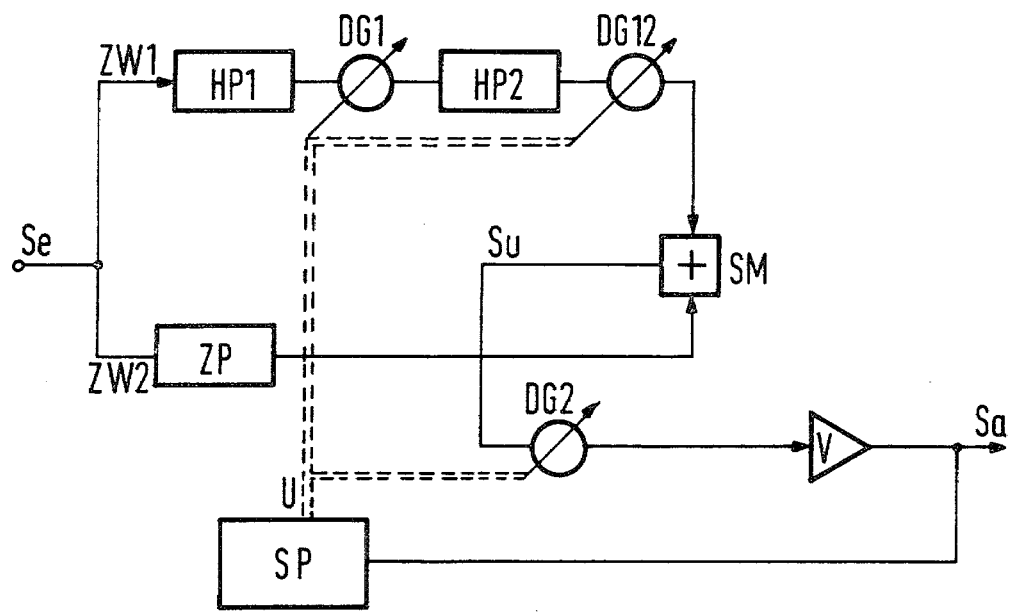
FIG. 10 is a schematic circuit diagram of a circuit arrangement constructed in accordance with the present invention for the distortion correction of a signal which has been transmitted via a line having quadratically increasing low-pass filter characteristics.

FIG. 10 illustrates a circuit arrangement which proves especially successful in the case the low-pass filter characteristic of the line concerned does not increase linearly with the line length. In this case, it is expedient to additionally arrange the high-pass filter HP2 and the attenuator DG12 in the branch ZW1. All attenuators are again regulated and controlled with the help of the same signal U. The high-pass filter HP2 and the attenuator DG12 can also be arranged in series with the attenuator DG1 illustrated in FIG. 2.

Figure 11:
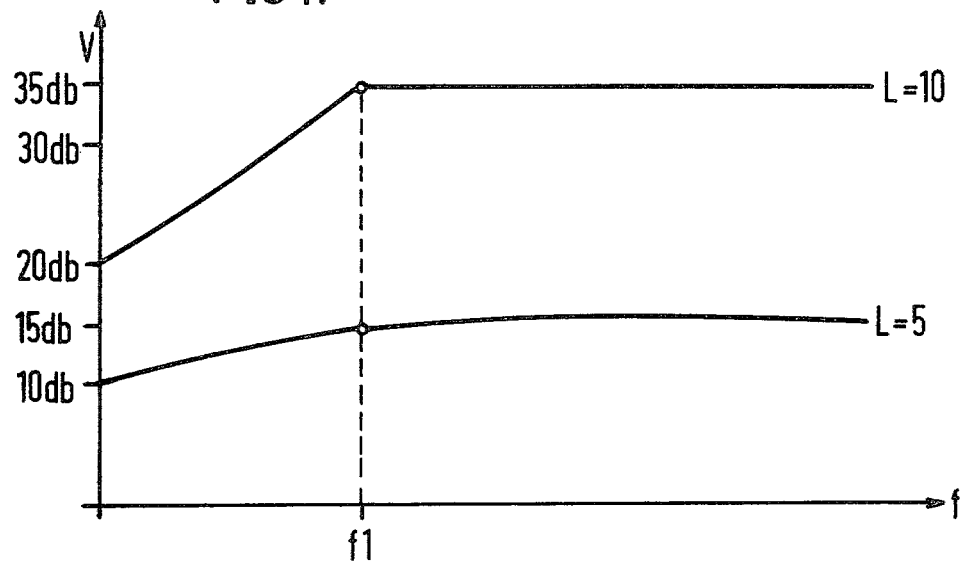
FIG. 11 illustrates amplifier characteristics relating to the mode of operation of the circuit arrangement illustrated in FIG. 10.

FIG. 11 illustrates the transmission characteristics of the circuit arrangement illustrated in FIG. 10. It is assumed that the proportional share, as in FIG. 4, increases to the doubled value upon increase of the line length from $L=5$ km to $L=10$ km. It is further assumed that the low-pass filter share increases not only by 5 db, but rather is trebled to 15 db upon increase of the line length. In order to take such line characteristics into consideration, the circuit arrangement illustrated in FIG. 2 effects the transmission characteristics illustrated in FIG. 11. It can be seen that, given a line length $L=5$ km, a proportional share of 10 db and a high-pass filter share of 5 db is achieved. It can also be seen that, given a line length of $L=10$ km, a proportional share of 20 db and a high-pass filter share of 15 db is achieved.

Figure 12:
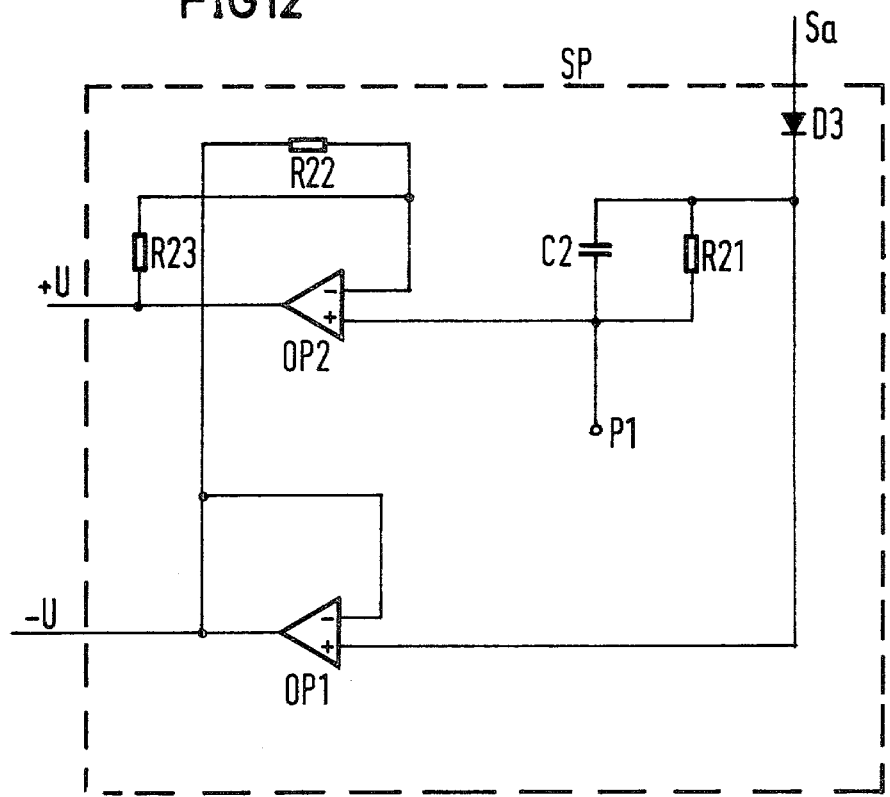
FIG. 12 is a schematic circuit diagram of an exemplary embodiment of a voltage source which is schematically illustrated in FIGS. 6 and 7.

FIG. 12 illustrates an exemplary embodiment of the voltage source SP illustrated in FIGS. 3, 6 and 7. The two operational amplifiers OP1 and OP2 each have a non-inverting channel having an input (+) and an inverting channel having an input (−). The distortion-corrected signal SA is supplied by way of a diode D3 to a terminal of a capacitor C2. The output of the operational amplifier OP1 is connected to the inverting channel of the operational amplifier OP1, on the one hand, and to the input of the inverting channel of the operational amplifier OP2 by way of a resistor R22, on the other hand. The non-inverting channel of the operational amplifier OP2 is connected by way of a circuit point P1 to a circuit point of a constant reference potential.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for automatic distortion correction of signals transmitted over a line which has a low-pass filter characteristic, comprising:

an input for receiving signals;

a distortion corrector including
 a high-pass filter having a predetermined frequency characteristic,
 a controllable first attenuator connected in series with said high-pass filter forming a first branch,
 a two-terminal network having a predetermined frequency characteristic forming a second branch,
 a common input terminal for said first and second branches, and
 summing means connecting and forming a common output for said first and second branches;

a controlled-gain amplifier connected in series with said
 distortion corrector and including
 an amplifier having a predetermined amplification, and
 a controllable second attenuator connected in series with said amplifier, said first and second attenuators having similar current/voltage characteristics;

an output for said circuit arrangement for providing a distortion-corrected signal; and control means connected between said output and said first and second attenuators for deriving a single control voltage for simultaneously controlling said attenuators in accordance with the distortion-corrected signal.

* * * * *